(12) United States Patent
Liu et al.

(10) Patent No.: US 8,983,136 B2
(45) Date of Patent: Mar. 17, 2015

(54) TRAFFIC SIGN DETECTING METHOD AND TRAFFIC SIGN DETECTING DEVICE

(75) Inventors: Liyan Liu, Beijing (CN); Xiaomeng Wang, Beijing (CN); Pingping Pan, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 254 days.

(21) Appl. No.: 13/608,401

(22) Filed: Sep. 10, 2012

(65) Prior Publication Data
US 2013/0077830 A1 Mar. 28, 2013

(30) Foreign Application Priority Data

Sep. 23, 2011 (CN) .......................... 2011 1 0284766

(51) Int. Cl.
*G06K 9/00* (2006.01)
(52) U.S. Cl.
CPC .................................. *G06K 9/00818* (2013.01)
USPC ......................................................... 382/104
(58) Field of Classification Search
None
See application file for complete search history.

(56) References Cited

U.S. PATENT DOCUMENTS

| 6,266,442 | B1 | 7/2001 | Laumeyer et al. |
| 7,068,844 | B1 * | 6/2006 | Javidi et al. .................. 382/218 |
| 2001/0036293 | A1 | 11/2001 | Laumeyer et al. |
| 2001/0043717 | A1 | 11/2001 | Laumeyer et al. |
| 2001/0043718 | A1 | 11/2001 | Laumeyer et al. |
| 2003/0016869 | A1 | 1/2003 | Laumeyer et al. |
| 2004/0062442 | A1 | 4/2004 | Laumeyer et al. |
| 2007/0154067 | A1 | 7/2007 | Laumeyer et al. |
| 2008/0137908 | A1 | 6/2008 | Stein et al. |
| 2009/0074249 | A1 | 3/2009 | Moed et al. |

FOREIGN PATENT DOCUMENTS

CN 101702197 A 5/2010

OTHER PUBLICATIONS

Bartneck, N. and W. Ritter. "Colour Segmentation with Polynomial Classification." *Pattern Recognition*, 1992. vol. II. Conference B: Pattern Recognition Methodology and Systems, Proceedings, 11th IAPR International Conference on the Hague, Netherlands, Aug. 30-Sep. 3, 1992, Los Alamitos, California, USA, IEEE Comput. Soc., US, Aug. 30, 1992, pp. 635-638.

(Continued)

*Primary Examiner* — Barry Drennan
*Assistant Examiner* — Siamak Harandi
(74) *Attorney, Agent, or Firm* — Harness, Dickey & Pierce, P.L.C.

(57) ABSTRACT

Disclosed are a method and a device for detecting traffic signs in an input image camera. The method comprises a color space converting step of converting the input image into a HSV color space image; a filtering step of filtering, based on a predetermined pass range of a standard color of each of the traffic signs, the HSV color space image to obtain a filtered image, and then generating one or more connected domains based on one or more regions in the filtered image; a removing step of removing, based on a standard rule of the corresponding traffic sign, at least one of the generated connected domains, not being the corresponding traffic sign, and letting others of the generated connected domains be candidate traffic sign domains; and a recognition step of recognizing, based on a feature of each of the candidate traffic sign domains, the corresponding traffic sign.

10 Claims, 10 Drawing Sheets

(56) References Cited

OTHER PUBLICATIONS

Janssen, R. et al. "Hybrid Approach for Traffic Sign Recognition." Intelligent Vehicles '93 Symposium, Tokyo, Japan, Jul. 14-16, 1993, New York, New York, USA, IEEE, US, Jul. 14, 1993, pp. 390-395.

Vitabile, S. et al. "Road Signs Recognition Using a Dynamic Pixel Aggregation Technique in the HSV Color Space." Image Analysis and Processing, 2001. Proceedings, 11th International Conference, Sep. 26-28, Piscataway, New Jersey, USA, IEEE, Sep. 26, 2001, pp. 572-577.

Extended European Search Report dated May 21, 2014 issued in corresponding European Application No. 12184369.2.

* cited by examiner

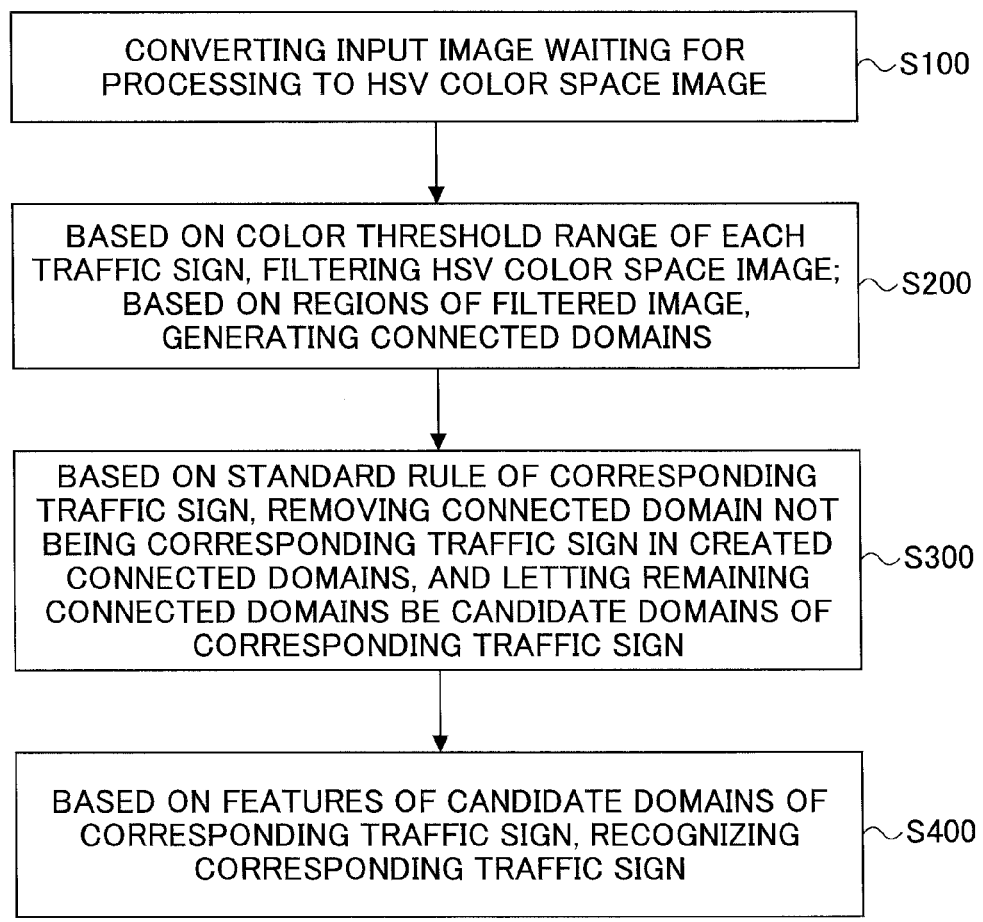

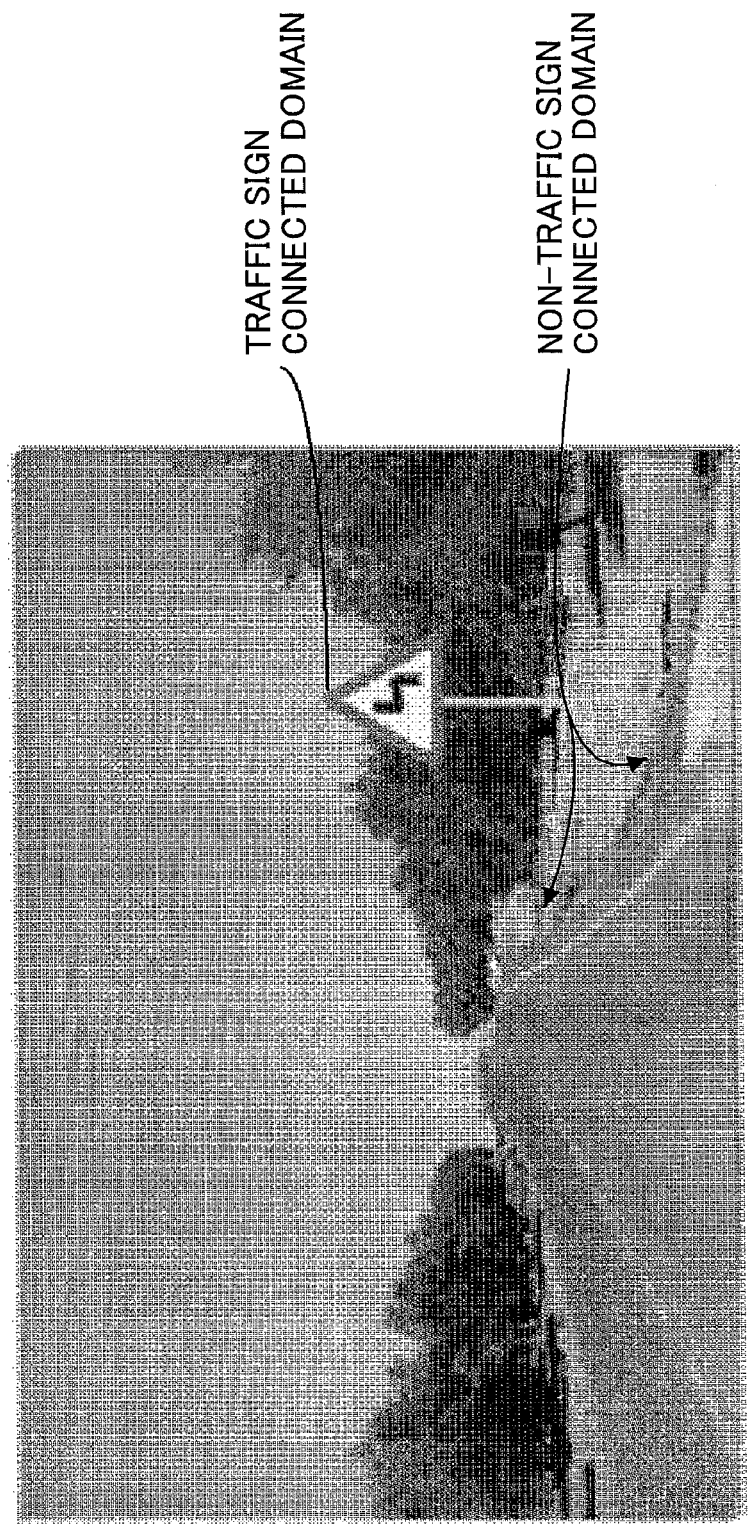

TRAFFIC SIGN DETECTING METHOD AND TRAFFIC SIGN DETECTING DEVICE

BACKGROUND OF THE INVENTION

1. Field of the Invention

The present invention relates to a traffic sign detecting method and a traffic sign detecting device.

2. Description of the Related Art

As development is continuing on an intelligent transportation system (ITS), and the intelligent transportation system has been widely used, a research on a traffic sign detecting technology has gradually garnered attention. Since standards of traffic signs adopted by various countries in the world are basically the same, a traffic sign detecting technology developed with regard to traffic signs of one country may be applied in other countries without any modifications or only with slight adjustments. As a result, this kind of traffic sign detecting technology has universal applicability.

Up to now, a certain amount of development has been carried out in the field of traffic sign detection; for example, many patents or patent applications have been made. In conventional techniques, color, shape information, or geometric features of traffic signs are utilized for performing detection and recognition with regard to the traffic signs in general. After the traffic signs are recognized, a driver may be notified of the recognized traffic signs in a manner of audio or visual information.

In the following cited Reference No. 1, a traffic sign detecting method is proposed. According to this method, pairs of colors and shapes are proposed by analyzing the basic color and the geometric shape of traffic signs. On the basis of this, relationship models of the traffic sign color and the traffic sign geometric shape are created. For example, a pair of (red, triangle) corresponds to a "prohibitive sign group". By employing the relationship models, it is possible to conduct detection with regard to the traffic signs. In this reference, seven such pairs of colors and shapes are created. However, in this method, information of color and shape is only used for performing the detection with regard to the traffic signs. Furthermore the shape information used in this method only corresponds to the outer shape of the traffic signs; in other words, this method does not relate to the application of the inner shape information of the traffic signs. As a result, this method may only be utilized for recognizing to what group a traffic sign usually belongs, or to put it another way, this method may not carry out accurate detection with regard to the traffic sign. In addition, sometimes it is impossible to totally distinguish the traffic sign from other objects only by using the color and the outer shape information.

In the following cited Reference No. 2, a method for traffic sign recognition is proposed. This method employs rotation and scale-invariance to perform pattern matching, and then recognizes a candidate traffic sign by adopting a way of calculating a degree of confidence. In this method, due to complexity of a scene, the pattern matching may generate a large amount of candidate traffic signs, i.e., traffic signs waiting for recognition, in some cases. If the number of the traffic signs waiting for recognition is too big, then the processing speed of this method may be badly affected. This results in lack of "real time" usually required by a traffic sign recognizing system.

In the following cited Reference No. 3, a method of detecting and recognizing traffic signs is proposed. In this method, an image is divided into two parts. As for one of the two parts, its color and shape information is utilized to carry out detection and recognition with regard to the traffic signs, and as for another one, it is utilized for achieving other assistant driving functions. However, in this method, only the color and the shape information is considered, and this method is only adapted for detecting a circular (a rectangle in the United States) "speed-limit" sign.

In a traffic sign system, it is possible to render the color and the shape of a traffic sign obviously different from that of other objects by carrying out design, but actually, in some scenes, particularly in a case where only the outer outline information of a traffic sign is utilized, it may be impossible to perfectly distinguish the traffic sign from the surrounding objects. On the other hand, since there are nearly one hundred different traffic signs in a traffic sign system of a country in general, a common object recognizing method based on color and shape may dramatically cost time when concretely recognizing a specific traffic sign; as a result, this kind of method is difficult to satisfy the requirement of processing time in actual use. In addition, after the traffic sign is recognized, when it is notified to a driver as a prompt or warning message, most of the conventional techniques do not take into account the concrete meaning of the traffic sign or its warning level.

Cited Reference No. 1: Chinese Patent Application Publication No. 101702197 A

Cited Reference No. 2: US Patent Application Publication No. 2009/0074249 A1

Cited Reference No. 3: US Patent Application Publication No. 2008/0137908 A1

SUMMARY OF THE INVENTION

The present invention seeks to solve the above described problems in the prior art. In embodiments of the present invention, a traffic sign detecting method and a traffic sign detecting device are provided.

The embodiments of the present invention belong to the field of object detection and object recognition. As a specific object group, traffic signs have their typical features in a road scene. By properly utilizing these features, it is possible not only to speed up a recognition process but also to effectively reduce a misrecognition rate even in a complicated scene.

According to one aspect of the present invention, there is provided a method of detecting one or more traffic signs in an input image captured by a camera. The method comprises a color space converting step of converting the input image into a HSV color space image; a filtering step of filtering, based on a predetermined pass range of a standard color of each of the traffic signs, the HSV color space image so as to obtain a filtered image, and then generating one or more connected domains based on one or more regions in the filtered image; a removing step of removing, based on a standard rule of the corresponding traffic sign, at least one of the generated connected domains, not being the corresponding traffic sign, and letting others of the generated connected domains be candidate traffic sign domains; and a recognition step of recognizing, based on a feature of each of the candidate traffic sign domains, the corresponding traffic sign.

According to another aspect of the present invention, there is provided a device for detecting one or more traffic signs in an input image captured by a camera. The device comprises a color space converting unit configured to convert the input image into a HSV color space image; a filtering unit configured to filter, based on a predetermined pass range of a standard color of each of the traffic signs, the HSV color space image so as to obtain a filtered image, and then to generate one or more connected domains based on one or more regions in the filtered image; a removing unit configured to remove, based on a standard rule of the corresponding traffic sign, at least one of the generated connected domains, not being the corresponding traffic sign, and to let others of the generated connected domains be candidate traffic sign domains; and a recognizing unit configured to recognize, based on a feature of each of the candidate traffic sign domains, the corresponding traffic sign.

Compared to the conventional techniques, the traffic sign detecting method and the traffic sign detecting device according to the embodiments of the present invention are more flexible and applicable. By utilizing the traffic sign detecting method and the traffic sign detecting device, it is possible to significantly improve driving safety.

BRIEF DESCRIPTION OF THE DRAWINGS

FIG. 2 illustrates an overall flowchart of a traffic sign detecting method according to a first embodiment of the present invention;

FIGS. 3A to 3F illustrate processes carried out with regard to an image waiting for processing, captured by a camera by employing the traffic sign detecting method according to the first embodiment of the present invention;

DETAILED DESCRIPTION OF THE PREFERRED EMBODIMENTS

Hereinafter, embodiments of the present invention will be concretely described with reference to the drawings. However it should be noted that the same symbols, which are in the specification and the drawings, stand for constructional elements having basically the same function and structure, and repeated explanations for the constructional elements are omitted.

Figure 1:
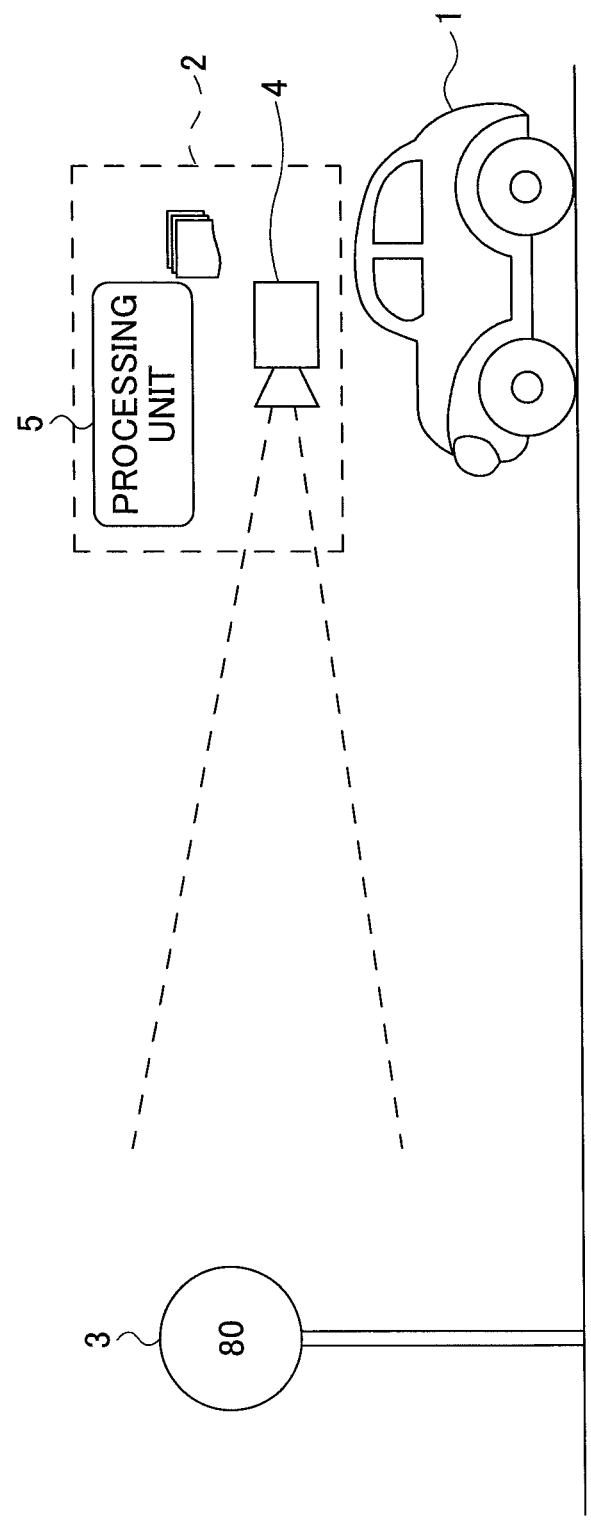
FIG. 1 illustrates an example of an application environment of a driving assistant system able to utilize embodiments of the present invention.

FIG. 1 illustrates an example of an application environment of a driving assistant system 2 able to utilize the embodiments of the present invention.

As shown in FIG. 1, the driving assistant system 2 is installed in a vehicle 1, and includes a camera 4 and a processing unit 5. The camera 4 may be mounted in the vehicle 1, and is used to acquire an image of a current environment in real time. The processing unit 5 is used to carry out traffic sign detection with regard to the acquired image. If a traffic sign 3 is detected, then it is recognized, and is used to notify a driver.

In what follows, a traffic sign detecting method according to a first embodiment of the present invention is concretely illustrated by referring to FIGS. 2 to 5.

FIG. 2 illustrates an overall flowchart of the traffic sign detecting method according to the first embodiment of the present invention.

As shown in FIG. 2, the traffic sign detecting method includes a color space converting step S100 of converting an input image waiting for processing, captured by a camera to a HSV color space image; a filtering step S200 of filtering the HSV color space image of the input image waiting for processing on the basis of a predetermined range of standard color (i.e., a predetermined color threshold range) of each of traffic signs (one or more), and generating one or more connected domains on the basis of regions in the filtered image; a removing step S300 of removing at least one connected domain not being the corresponding traffic sign, in the generated connected domains on the basis of a standard rule of the corresponding traffic sign, and letting the remaining connected domains be candidate domains of the corresponding traffic sign; and a recognizing step S400 of recognizing the corresponding traffic sign on the basis of the features of the candidate domains of the corresponding traffic sign.

FIGS. 3A to 3F illustrate processes carried out with regard to an image waiting for processing, captured by a camera by employing the traffic sign detecting method according to the first embodiment of the present invention.

Figure 3A:
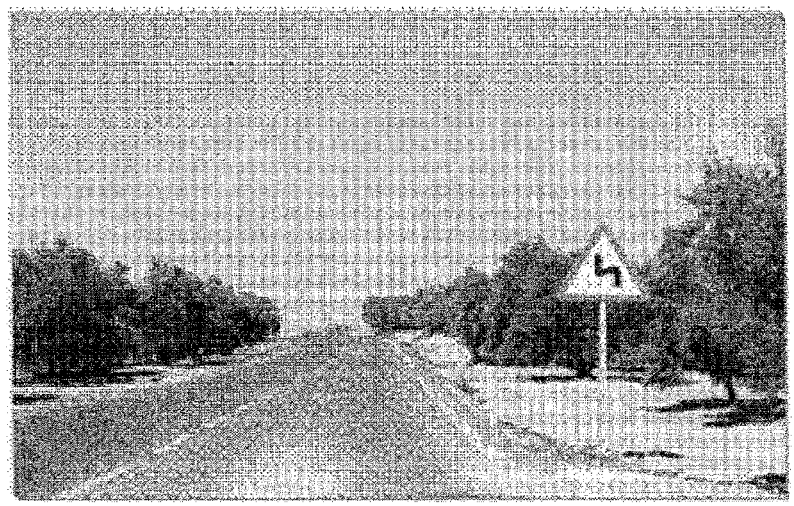

FIG. 3A illustrates the image waiting for processing, originally captured by the camera (a vehicle-mounted camera).

In general, in each traffic sign system, color information is standardized; as a result, the color information may be used to detect a possibly existing region of a traffic sign in an image. However, due to influence of lighting conditions such as a bad weather condition, a daytime condition, a night condition, etc., the color information is unstable. Since a HSV (Hue, Saturation, and Value) color space may significantly reduce the influence applied to the color information, caused by the lighting conditions than a RGB (Red, Green, and Blue) color space does, the image captured by the vehicle-mounted camera is converted from the RGB color space to the HSV color space by employing the above described color space converting step S100.

According to the first embodiment of the present invention, in order to effectively carry out the traffic sign recognition, it is necessary to effectively and reasonably organize standard traffic signs in a system. In the first embodiment, an organizing way called a "feature tree" approach is adopted.

The traffic sign detecting method according to the first embodiment further includes a traffic sign feature tree creating step of creating a traffic sign feature tree by classifying the traffic signs into large classes according to the color features of the outer outlines of the traffic signs; then for each of the large classes, classifying its members into small classes according to the shape features of the outer outlines of its members; and then for each of the small classes, classifying its members into subclasses according to the shape features of the inner outlines of its members.

It is apparent that this traffic sign feature tree creating step may be carried out in parallel with the above described other steps (except the recognizing step S400) of the traffic sign detecting method. In other words, as long as the traffic sign feature tree creating step may provide the traffic sign feature tree before the recognizing step S400, it may be performed at any time. For example, the traffic sign feature tree creating step may be performed off line, i.e., may be finished as a prepared work before carrying out the other steps of the traffic sign detecting method.

Next, how to create the feature tree is concretely illustrated.

In general, in a traffic sign system of a country, each of traffic signs has standard color and standard shape including an outer shape such as a triangle, a circle, or a rectangle, etc., as well as an inner shape. By conducting design so as to let each of the traffic signs have a typical feature, and have a contrast ratio as higher as possible than that of the surrounding environment in a road scene, the corresponding traffic sign may be very easily recognized and understood by a driver.

Figure 4:
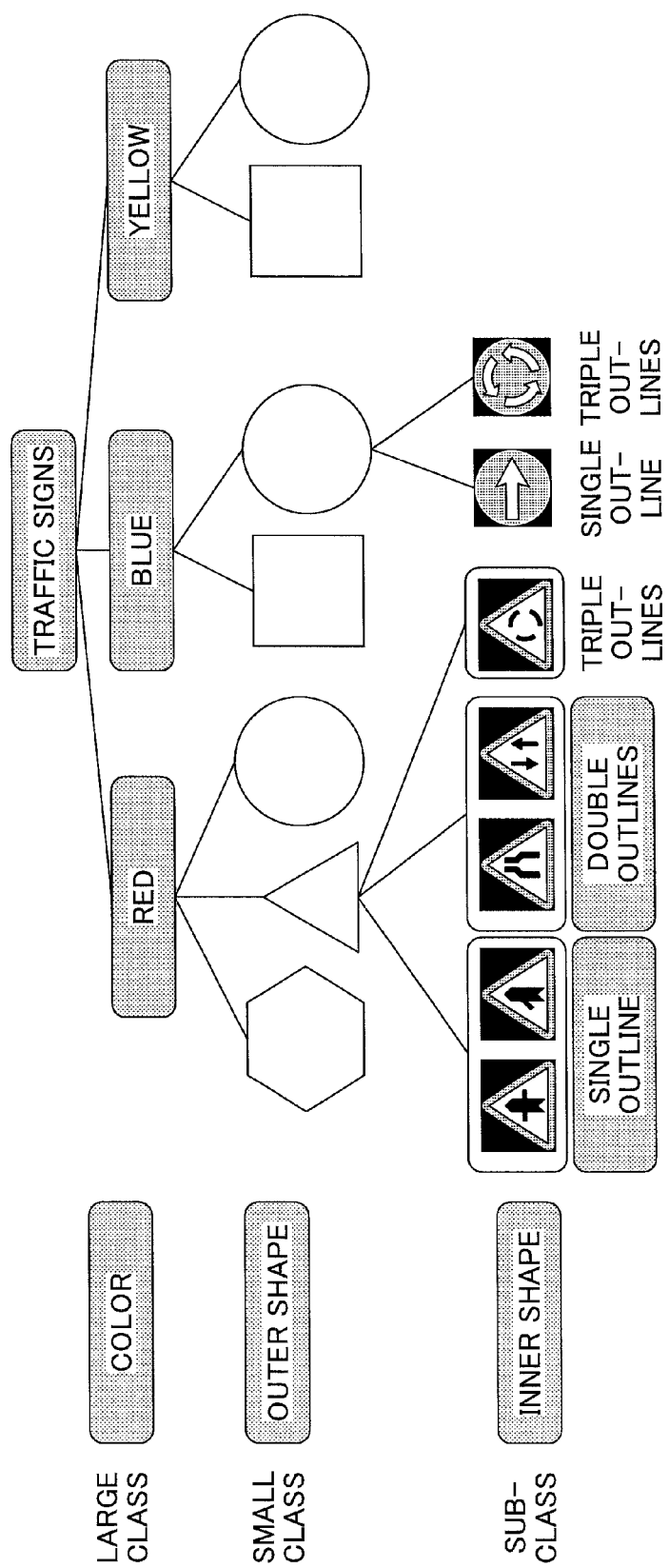
FIG. 4 illustrates an example of a feature tree obtained by performing, on the basis of features of standard traffic signs, classification with regard to the standard traffic signs, in the first embodiment of the present invention.

These kinds of features may be divided into different layers so as to create a feature tree as shown in FIG. 4.

FIG. 4 illustrates an example of a feature tree obtained by performing, on the basis of the features of standard traffic signs, classification with regard to the standard traffic signs, in the first embodiment of the present invention.

In FIG. 4, a traffic sign system of a country is taken as an example. In the top layer (the first layer), the feature mainly refers to "color"; here the color stands for the color of the outer outline of a traffic sign in the traffic sign system. The traffic signs in the traffic sign system are divided into three classes, namely a red color class, a blue color class, and a yellow color class. Each kind of color has a specific meaning. For example, a red color sign usually stands for warning and prohibitive information. The different classes in the first layer may be called "large classes".

In the middle layer (the second layer), the feature mainly refers to "outer shape". The large classes represented by the different colors have different outer shape features. For example, as for a red color traffic sign, its possible outer shape may be a circle, a triangle, or a hexagon, and as for a blue color traffic sign, its possible outer shape may only be a rectangle or a circle. On the basis of this, once the color of a traffic sign is determined, its possible outer shape may be determined as being in a predetermined range. This may be used for limiting a detecting and recognizing range of the corresponding traffic sign. The different classes in the second layer may be called "small classes".

In the bottom layer (the third layer), the feature mainly refers to "inner shape". It is possible to further classify the traffic signs in a small class into different classes according to the number of the inner outlines of each of the traffic signs. For example, a "single-outline class" indicates that each member has only one inner outline. Similarly, there may be a "double-outline class", and a "triple-outline class", etc. The different classes in the third layer may be called "subclasses".

The feature tree created in this way may be utilized in the follow-on detection and recognition processes so as to achieve progressive operations; as a result, it is possible to gradually downscale a retrieval range, to carry out accurate positioning, and to improve efficiency.

Here it should be noted that although only a few standard traffic signs are listed in FIG. 4, those people skilled in the art should understand that each of the standard traffic signs in the traffic sign system of a country should be classified into a subclass, for all of the standard traffic signs may be classified basically according to the above described principle.

After the image waiting for processing is converted to the HSV color space image by the processing of the color space color converting step S100, according to the filtering step S200, color division is carried out with regard to the converted HSV color space image so as to generate one or more connected domains.

According to the filtering step S200, each of the pixels of the HSV color space image is filtered on the basis of a predetermined hue pass range and a predetermined saturation pass range of the standard color of the corresponding traffic sign. Only when the hue value and the saturation value of the corresponding pixel are within the predetermined hue pass range and the predetermined saturation pass range, respectively, the corresponding pixel is retained (i.e., passed through). This kind of filtering may be considered as a kind of image division based on color (i.e., the above mentioned color division); in other words, by carrying out the filtering, the HSV color space image is divided into two parts. A rule of the filtering may be such that based on both the standard color prescribed in a traffic sign system and statistical information of the traffic sign color in different circumstances, a color threshold range (also called a "pass range") is determined in a HSV color space, and then by performing filtering according to the determined color threshold range, it is possible to retain one or more regions where the corresponding traffic sign possibly exists.

The threshold based division may be based on a H (hue) value and a S (saturation) value. It is possible to acquire distributional ranges of hue and saturation of each standard color on the basis of a large amount of sample images, for example, $[h_L, h_H]$ (i.e., the distributional range of hue) and $[S_L, S_H]$ (i.e., the distributional range of saturation), respectively, and let the two be pass ranges with regard to hue and saturation. Here it should be noted that the determination of the color threshold ranges (i.e., the pass ranges) may be achieved by using a well-known approach in the prior art.

For example, in a case where the color division is carried out with regard to a traffic sign having a red color outer outline, predetermined pass ranges of hue and saturation of red color may be utilized. Regarding a pixel in a HSV color space image waiting for color division, when its hue is within the pass range of hue $[h_L, h_H]$, and its saturation is within the pass range of saturation $[S_L, S_H]$, it may pass the filtering; that is, it may be considered as a red color pixel, and may be given a high value (for example, 1), otherwise a low value (for example, 0).

Figure 3B:
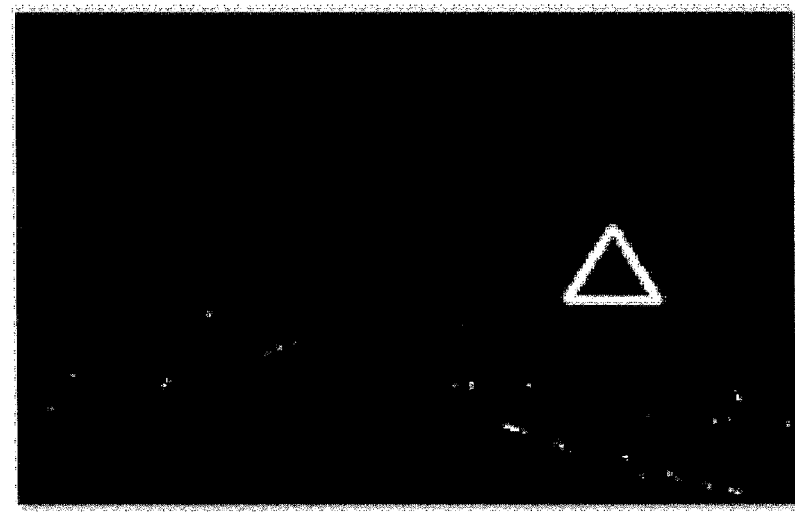

FIG. 3B illustrates an image obtained after the color division is performed with regard to the original road scene image shown in FIG. 3A. In FIG. 3B, the bright spots or regions stand for those formed by the pixels passing through the filtering. A similar operation may be applied to color division carried out with regard to a blue, yellow, or other color traffic sign.

The color division is performed on the first layer of the feature tree shown in FIG. 4, i.e., on the layer whose feature is color. After the above described processing, it is possible to determine to which large class a region passing through the filtering should belong. For example, a region passing through filtering conducted with regard to red color should belong to a large class of red color. Of course, perhaps this region will be removed finally since it is not a real traffic sign; however, it may be said that if it is a real traffic sign, it should belong to the large class.

Next, by utilizing the second layer of the feature tree, i.e., the outer shape feature, it is possible to determine to which small class the region passing through the filtering should belong.

Here it should be noted that the filtering step S200 according to this embodiment may adopt a conventional approach called a "connected component analysis (CCA)" to generate the connected domains. By applying this approach, it is possible to generate a connected domain in a filtered image so as to extract an outer outline feature. In order to render a result of performing the connected domain generation more accuracy, before the CCA is applied, it is also possible to selectively carry out a smoothing process with regard to the filtered image so as to remove noise influence.

FIG. 3C illustrates an image including the connected domains generated based on the divided image shown in FIG. 3B.

The image shown in FIG. 3C is obtained by adding the connected domains onto the original image shown in FIG. 3A. As shown in FIG. 3C, aside from the traffic sign connected domain, there are two non-traffic sign connected domains too. In particular, the non-traffic sign connected domains may be generated from, for example, flowers or grass whose color is the same with that of the corresponding traffic sign; in other words, these kinds of flowers or grass may pass through the filtering since their color is the same with that of the corresponding traffic sign. Here it should be noted that the results (i.e., pixel values) of carrying out the above mentioned steps may be recorded, and may be combined with the previous image data according to demands of the follow-on processes.

Next, according to the removing step S300, the generated non-traffic sign domains are removed on the basis of one or more of the following standard rules of a traffic sign:

(a) the aspect ratio of a connected domain;
(b) the position of a connected domain in an image waiting for processing;
(c) the area value of a connected domain;
(d) the color pattern of a connected domain;
(e) the shape complexity of a connected domain; and
(f) the texture complexity of a connected domain.

In general, the data of the connected domains created by the step S200 is related to the complexity of a scene. However, in an image (for example, the image shown in FIG. 3C), only a few connected domains (only one in FIG. 3C) is a real traffic sign (i.e., the corresponding traffic sign), and others may be "noise", i.e., "non-traffic sign" domains. By removing these kinds of non-traffic sign domains, it is possible to decrease the number of options waiting for processing (i.e., candidate traffic signs waiting for detection and recognition) in the follow-on steps, and to reduce the follow-on misdetection rate.

When utilizing the removing step S300, it is possible to create a standard rule of the corresponding traffic sign on the basis of the typical feature of the corresponding traffic sign itself, and then to employ the above described rules (a) to (f) so as to remove at least one connected domain obviously not being the corresponding traffic sign.

Next, the application of each of the rules (a) to (f) is described in detail.

(a) The Aspect Ratio of a Connected Domain

When a traffic sign is designed, it should have standard shape and size, and its aspect radio should coincide with a predetermined range. As a result, if it is detected that the aspect ratio of a connected domain is not within the predetermined range, then the connected domain should be removed.

(b) The Position of a Connected Domain in an Image Waiting for Processing

Taking into account an actual road scene, a traffic sign appearing in an image means that the position of the traffic sign in the image should be limited to a certain region. As a result, by detecting the position of a connected domain in an image waiting for processing, it is possible to remove the connected domain if the detected position of the connected domain is located at a region where a traffic sign corresponding to the connected domain should not appear. For example, if it is detected that a connected domain is located at a bottommost position of an image, then the connected domain may be removed. In a case of, for example, a vehicle-mounted camera, what the vehicle-mounted camera captures is a scene in front of the vehicle; as a result, only a traffic sign having a certain distance from the vehicle and a certain height is meaningful to a driver. In general, a bottommost position of an image is very close to a vehicle; therefore a traffic sign should not appear at the bottommost position.

(c) The Area Value of a Connected Domain

A connected domain having an area value too big or an area value too small in an image should not be a traffic sign. As a result, it is possible to predetermine an area value range on the basis of sample data or a rule of thumb. If it is detected that the area vale of a connected domain is not within the predetermined area value range, then the connected domain may be removed.

(d) The Color Pattern of a Connected Domain

A traffic sign has standard color and pattern design. If it is detected that a connected domain does not coincide with the standard design, then the connected domain may be removed. Here, the said color pattern stands for an inner color pattern of a traffic sign. It is supposed that other objects having red color approaching standard red color of a traffic sign passed through color filtering; however, since there is not a standard color which the traffic sign should have, for example, white color or black color, inside the traffic sign, this kind of connected domain may not pass through determination utilizing the color pattern. Similarly, it is also possible to employ the color pattern of a connected domain so as to take out a connected domain which has standard outer outline color of other traffic signs, for example, blue color or yellow color, but is obviously not a traffic sign.

For example, perhaps a case, where a "red brick or wall" remains after the color filtering since the color of the red brick or wall is similar to the color of a red traffic sign, may appear. However, compared to the red traffic sign, the inner color of this kind of connected domain (i.e., the red brick or wall) is entirely red, whereas, the inner color of the red traffic sign is different from its outer outline color, for example, white color or black color. As a result, by utilizing the inner color of a traffic sign, it is possible to do away with a "non-traffic sign" domain.

(e) The Shape Complexity of a Connected Domain

A traffic sign is usually designed to show a simple and easily understood shape, for example, a circle, a rectangle, or a triangle; that is, a too complicated shape may not be adopted. As a result, by utilizing, for example, the following equation (1) to calculate the shape complexity of a connected domain, it is possible to take out a connected domain whose shape is irregular and too complicated.

$$\text{contour}_{Complexity} = \frac{4 \times \pi \times R}{L \times L} > \text{contour\_threshould} \quad (1)$$

Here R refers to the area value of a connected domain, and L refers to the perimeter value of the connected domain. If the shape complexity $\text{contour}_{complexity}$ of the connected domain is greater than a shape complexity threshold value contour_threshold, then the connected domain may be removed. The shape complexity threshold value contour_threshold may be obtained by carry out sample training.

(f) The Texture Complexity of a Connected Domain

The design of a traffic sign usually is easily understood, and its texture may not be too complicated. By utilizing, for example, the following equation (2) to calculate a gray level co-occurrence matrix, it is possible to obtain the texture complexity of a connected domain. As a result, it is possible to do away with a connected domain whose texture is too complicated.

$$P(i, j) = \frac{\#\{[(x_1, y_1), (x_2, y_2)] \in S \mid f(x_1, y_1) = i \,\&\, f(x_2, y_2) = j\}}{\#S} \quad (2)$$

Here P(i, j) refers to an element of the gray level co-occurrence matrix. If the gray level of a pixel in an original image is N, then the size of the gray level co-occurrence matrix P is N*N. #(x) refers the number of elements in a set x. #S refers to the number of elements in the image f. The numerator $\#\{[(x_1, y_1), (x_2, y_2)] \in S"f(x_1, y_1)=i \,\&\, f(x_2, y_2)=j\}$ refers to the number of pixel pairs; each of the pixel pairs has a pixel $(x_1, y_1)$ having a gray level i in the image f and a pixel $(x_1, y_1)$ having a gray level j in the image f.

It is possible to select one or more of the rules (a) to (f) so as to check connected domains, and then to remove at least one of the connected domains which is obviously not the connected domain of a traffic sign. Also different connected domains in the same image may be checked by adopting different rules selected from the rules (a) to (f), or by adopting a combination of plural rules selected from the rules (a) to (f). In a case where plural of the rules (a) to (f) are selected, the check may be carried out in any order.

In this way, after the generated non-traffic sign domains are removed, the remaining connected domains serve as the candidate traffic sign domains.

Figure 3D:
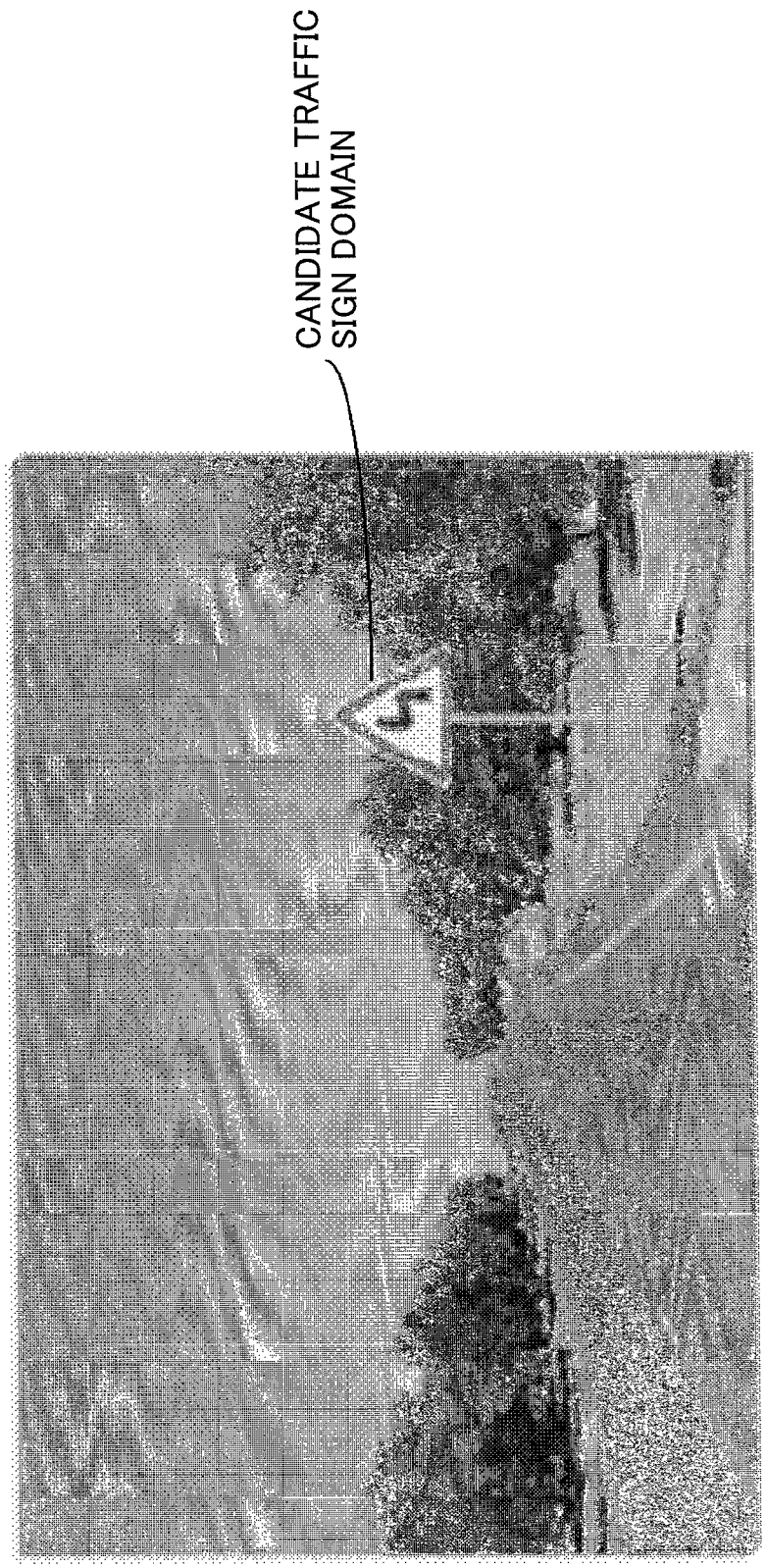

FIG. 3D illustrates a result of removing, by utilizing the removing step S300, the "non-traffic signs" connected domains from the image shown in FIG. 2. Here it should be noted that in FIG. 3D, there is only one candidate connected domain (i.e., the candidate traffic sign domain). In another words, in another example, there may be plural candidate traffic sign domains.

After the removing step S300, at least one connected domain (such as a connected domain of roadside flowers) not belonging to the corresponding traffic sign is removed, and only the connected domains possibly being the corresponding traffic sign are retained to serve as the candidate traffic sign domain. In the removing process, the check based on the above described rules, carried out with regard to the connected domains is preferred to be carried out according to an order from low complexity to high complexity, for example, an order from the rule (a) to the rule (f). Once one of the rules (a) to (f) is violated, it is possible to exit from the check process, and to throw away the current connected domain. By employing this approach, most of the non-traffic sign connected domains may be removed so that it is possible to improve the processing efficiency of the follow-on processes.

After the processing of the removing step S300, the corresponding traffic sign is recognized on the basis of the candidate traffic sign domain by utilizing the recognizing step S400.

Figure 5:
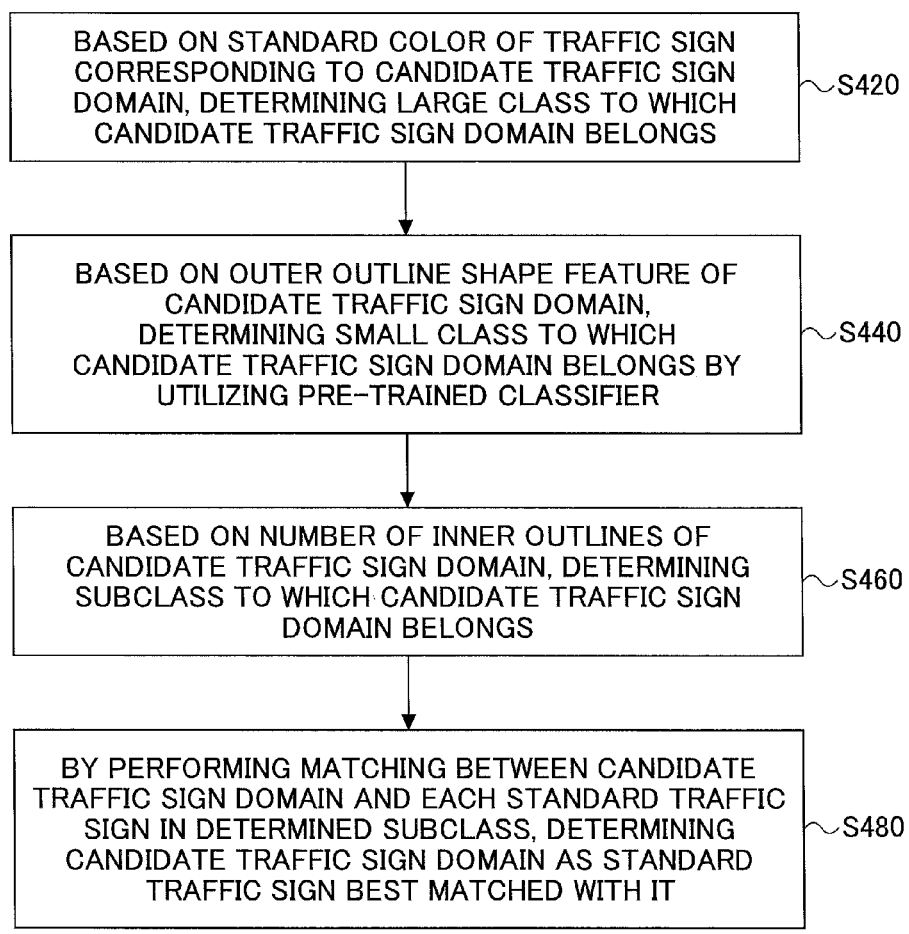
FIG. 5 illustrates a flowchart of a recognizing process in the first embodiment of the present invention.

FIG. 5 illustrates a flowchart of the recognizing step S400 in the first embodiment of the present invention.

As shown in FIG. 5, the recognizing step S400 may concretely include a large class determining step S420 of determining, based on the standard color of a traffic sign corresponding to the candidate traffic sign domain, a large class to which the candidate traffic sign domain belongs; a small class determining step S440 of determining, based on the outer outline shape feature of the candidate traffic sign domain, a small class to which the candidate traffic sign domain belongs, by utilizing a pre-trained classifier; a subclass determining step S460 of determining, based on the number of the inner outlines of the candidate traffic sign domain, a subclass to which the candidate traffic sign domain belongs; and a traffic sign matching step S480 of determining, by performing matching between the candidate traffic sign domain and each standard traffic sign in the determined subclass, the candidate traffic sign domain as a standard traffic sign best matched with the candidate traffic sign domain.

The candidate traffic sign domain belongs to those connected domains which passed through the pass ranges based on the H (hue) value and the S (saturation) value of the standard color of a real traffic sign; as a result, it is possible to easily determine, in the large class determining step S420, the outer outline color of the candidate traffic sign domain, i.e., the large class.

After that, in the determined large class, the small class determining step S440 determines the small class to which the candidate traffic sign belongs. The operation of this step is conducted on the "outer shape" layer of the feature tree; based on the outer shape feature of the candidate traffic sign domain, it is classified into the corresponding small class. In general, each outer outline color includes a few specific shapes; therefore, as for different color domains, it is possible to perform classification only according to some limited shapes.

In order to be able to accurately recognize the corresponding traffic sign occurring in the road scene, it is possible to utilize an offline feature training classifier of traffic sign samples based on rotation and scale-invariance in advance. Usually a one-dimensional Fourier descriptor (1-d FD) feature may be selected. However, the present invention is not limited to this; in other words, in this embodiment, it is also possible to adopt other features such as an outline moment, and the like.

As for the candidate traffic sign domain whose large class has been determined in the large class determining step S420, its one-dimensional Fourier descriptor feature is extracted, and then whether it is a real traffic sign is determined by using the pre-trained classifier. For example, when a blue candidate traffic sign domain is taken as an example, it is possible to only use a circle classifier and a rectangle classifier to carry out the determination, for only these two shapes may probably occur in a real traffic sign having a blue outer outline. In particular, if a candidate traffic sign domain having a red hexagonal shape is detected, then, in this case, actually this candidate traffic sign domain should be concretely recognized, i.e., this candidate traffic sign domain should be a "stop" sign, for the red hexagonal shape refers only to this kind of traffic sign. However, this case is a special exception; on the basis of universality, the processing should be continued holistically.

Figure 3E:
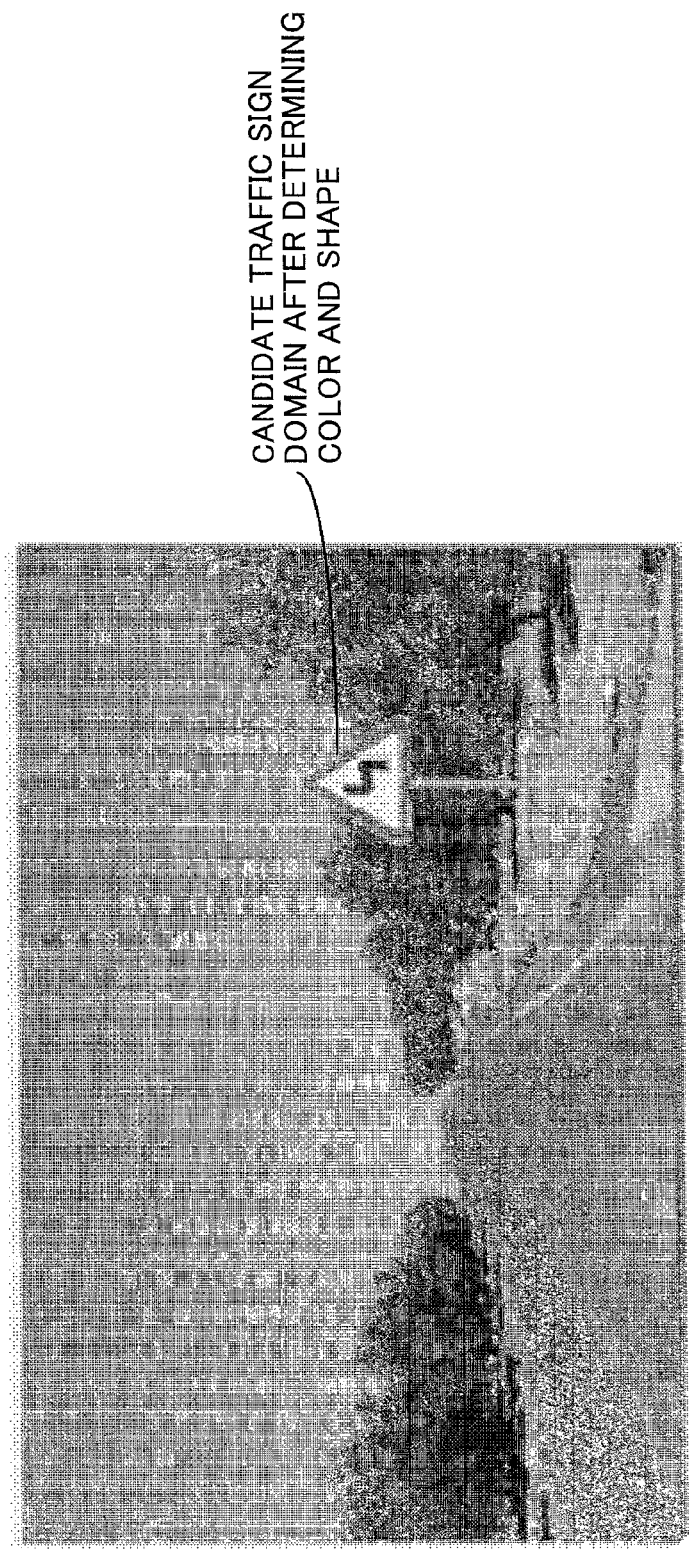

FIG. 3E illustrates a result of further determining the color and the shape of the candidate traffic sign domain in the image shown in FIG. 3D. Here the color and the shape of the candidate traffic sign domain in FIG. 3E is determined as a red triangle. By the assistance of the feature tree, the progressive operations are accomplished; in this way, it is possible to gradually narrow the range needing to be detected and recognized, thereby being able to improve the processing efficiency.

After the outer shape of the candidate traffic sign domain is determined by the small class determining step S440, the corresponding subclass (i.e., a subclass based on the number of the inner outlines of the candidate traffic sign domain) to which the candidate traffic sign domain belongs is further determined by the subclass determining step S460. The recognizing process in this subclass determining step is carried out on the bottom layer, i.e., the "inner shape" layer, of the feature tree. After the small class is determined in the small class determining step S440, the recognition in this subclass determining step may be performed only in some limited subclasses. In particular, it is possible to obtain the number of the inner outlines in the candidate traffic sign domain waiting for recognition by utilizing the above mentioned CCA approach to determine the number of the inner outlines so that the candidate traffic sign domain may be classified into its corresponding subclass, namely a single-outline subclass, a double-outline subclass, or a triple-outline subclass, etc.

After that, by employing the matching step S480, the feature distance between the inner outline feature of the candidate traffic sign domain and the inner outline feature of each standard traffic sign in the corresponding subclass is calculated, and a standard traffic sign corresponding to the minimum feature distance is determined as best matched with the candidate traffic sign domain.

The processing in the matching step S480 is conducted on the basis of the determined subclass; that is, the inner outline feature of the candidate traffic sign domain is extracted, and then is matched with the standard inner outline feature of each standard traffic sign in the determined subclass. Here the above mentioned Fourier descriptor (FD) feature is taken as an instance again. The candidate traffic sign domain is recognized by using the following equation (3).

$$\text{result} = \min_{i \in [1,n]} (d(FD_{candidate}, FD_{sign_i})) \quad (3)$$

Here $FD_{candidate}$ refers to the FD feature of the candidate traffic sign domain. $FD_{sign_i}$ refers to the FD feature of each standard traffic sign in the determined subclass, wherein, i refers to an index, and n refers to the number of the standard traffic signs in the determined subclass (for example, a single-outline subclass). d( ) refers to a function for calculating the feature distance between the FD feature of the candidate traffic sign domain and the FD feature of each standard traffic sign. It should be noted that d( ) may be used to calculate a Euclidean distance, or a Bhattacharyya distance, etc. All of these kinds of distances may embody the matching degree between the two FD features. A standard traffic sign $sign_i$ corresponding to the minimum one among n distances calculated by the function d( ), is recognized as the result result of recognizing the candidate traffic sign domain by employing the equation (3).

Here it should be noted how to calculate the above mentioned distance (for example, the Euclidean distance or the Bhattacharyya distance) is well known to those people skilled in the art. No matter what approach is adopted, a standard traffic sign whose feature is best matched with that of the candidate traffic sign domain may be recognized as the corresponding traffic sign of the candidate traffic sign domain.

Figure 3F:
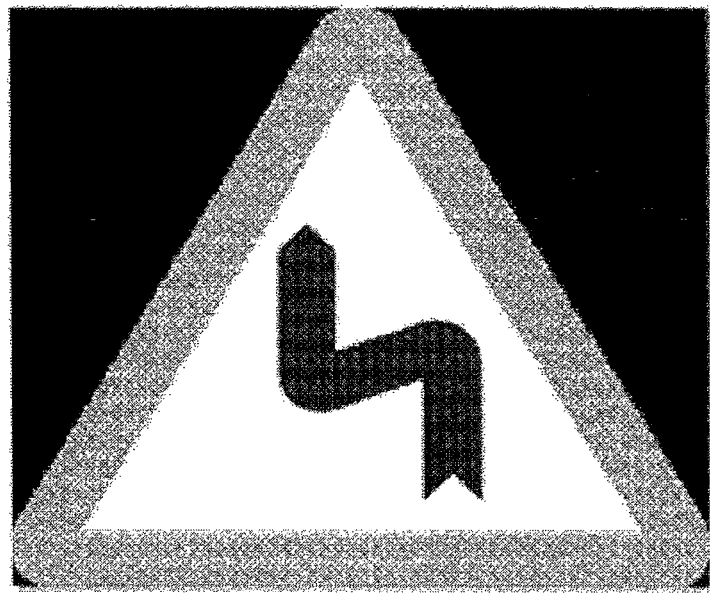

FIG. 3F illustrates a result of recognition carried out with regard to the candidate traffic sign domain shown in FIG. 3E, whose color and shape has been determined.

After the corresponding traffic sign is recognized, conventionally it is notified to a driver in a manner of audio or visual information. In the conventional techniques, all traffic signs are treated equally; that is, the meaning of each of the traffic signs has not been taken into account. However, in an actual circumstance, different traffic signs have different meanings; as a result, they have different important degrees to a driver too. For example, a "prohibitive" sign or a "speed-limit" sign is more important to a driver than an information sign such as "there is a gas station ahead on the left". As for the former, if it is ignored, then the driver may get into danger; however, as for the latter, its severity is much lower than that of the former.

After the corresponding traffic sign in the image captured by the camera is recognized concretely, preferably, in this embodiment, it is possible to further determine a way, by which the recognized corresponding traffic sign is notified to a driver, based on both the important degree of the corresponding traffic sign and the distance between the corresponding traffic sign and the camera. If the camera is a vehicle-mounted camera, then the distance between the corresponding traffic sign and the camera may be usually regarded as the distance between the vehicle and the corresponding traffic sign, or the distance between the camera and the fore of the vehicle may be considered when determining the distance of the vehicle to the corresponding traffic sign.

Therefore the traffic sign detecting method according to this embodiment may further comprise a distance calculating step of, after recognizing the corresponding traffic sign, calculating the actual distance between the camera and the corresponding traffic sign based on the focal length of the camera for capturing the image waiting for processing, the size of the corresponding traffic sign on the imaging sensor of the camera, and the actual size of the corresponding traffic sign in the physical world.

In particular, it is possible to adopt the following equation (4) to calculate the distance d between the camera (the vehicle) and the corresponding traffic sign.

$$\frac{f}{d-f} = \frac{li}{L} \quad (4)$$

Here f refers to the focal length of the camera; li refers to the size of the corresponding traffic sign on the imaging sensor of the camera (for example, a CCD or a C-MOS); and L refers to the actual size of the recognized corresponding traffic sign in the physical world. In this way, it is possible to calculate the distance d between the current camera (the vehicle) and the corresponding traffic sign.

Moreover, the traffic sign detecting method according to this embodiment may further comprise a notifying step, i.e., notifying a driver of the corresponding traffic sign in a way determined on the basis of both the meaning of the recognized corresponding traffic sign and the actual distance between the corresponding traffic sign and the camera (the vehicle).

Here it should be noted that after the corresponding traffic sign is recognized, its meaning may be obtained accordingly. As a result, it is possible to provide a flexible warning way based on the combination of the two, namely the important degree of the corresponding traffic sign and the distance between the camera (the vehicle) and the corresponding traffic sign.

In particular, the corresponding traffic sign may be, based on its important degree, classified into the following classes:

(a) a class of low importance traffic signs;
(b) a class of middle importance traffic signs; and
(c) a class of high importance traffic signs.

The distance between the camera (the vehicle) and the corresponding traffic sign may be classified in the following classes:

(i) a class of low severity distances; and
(ii) a class of high severity distances.

The warning way is determined based on the two; a few examples are as follows:

(1) Cases (a-i) and (a-ii)

In these cases, it is possible to notify the driver by using visual information. For instance, if the above mentioned "there is a gas station ahead on the left" sign is detected, then considering that the influence applied to driving safety, caused by this sign belongs to that of the low importance class, it is possible to only using the visual information to make a notification.

(2) Cases (c-i) and (a-ii)

In these case, it is possible to notify the driver by employing two ways, namely a visual sense way and an audio way (for example, a beep sound) at the same time. For example, if it is detected that there is a "stop" sign far away, then at this time, this kind of notifying way, not only able to give a warning to the driver but also not disturbing the driver too much, may be the best.

(3) Cases (c-ii) and (b-ii)

In these cases, it is possible to warn the driver in a manner of controlling the vehicle, for example, forcibly letting the vehicle slow down or stop so as to avoid latent danger. For example, in a case where a "stop" sign is detected in front of the vehicle, and is near enough, at this time, if it is found that the driver has not taken any action, then it is possible to forcibly stop the vehicle so as to avoid a dangerous occurrence.

Figure 6:
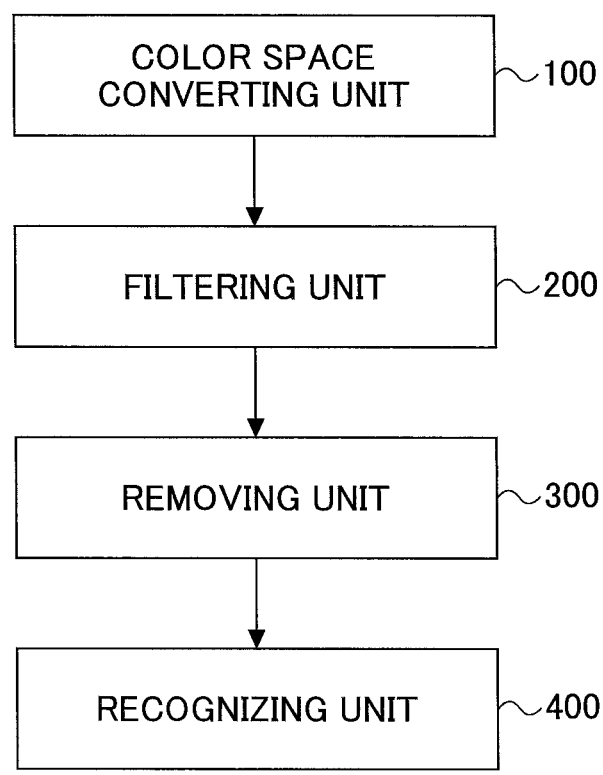
FIG. 6 is an overall block diagram of a traffic sign detecting device according to a second embodiment of the present invention.

In what follows, a traffic sign detecting device according to a second embodiment of the present invention is concretely illustrated by referring to FIG. 6.

FIG. 6 is an overall block diagram of the traffic sign detecting device according to the second embodiment of the present invention.

The traffic sign detecting device is configured to carry out the above described traffic sign detecting method according to the first embodiment of the present invention. As shown in FIG. 6, the traffic sign detecting device may comprise a color space converting unit 100 configured to perform the above described color space converting step S100 so as to convert an input image, captured by a camera, waiting for processing into a HSV color space image; a filtering unit 200 configured to perform the above described filtering step S200 so as to filter the HSV color space image of the input image waiting for processing on the basis of a predetermined range of standard color (i.e., a predetermined color threshold range) of each of traffic signs, and generate one or more connected domains on the basis of regions in the filtered image; a removing unit 300 configured to perform the above described removing step S300 so as to remove at least one connected domain not being the corresponding traffic sign, in the generated connected domains on the basis of a standard rule of the corresponding traffic sign, and let the remaining connected domains be candidate domains of the corresponding traffic sign; and a recognizing unit 400 configured to perform the above described recognizing step S400 so as to recognize the corresponding traffic sign on the basis of the features of the candidate domains of the corresponding traffic sign.

The traffic sign detecting device may further comprise a traffic sign feature tree creating unit configured to perform the above described traffic sign feature tree creating step so as to create a traffic sign feature tree by classifying the traffic signs into large classes according to the color features of the outer outlines of the traffic signs; then for each of the large classes, classify its members into small classes according to the shape features of the outer outlines of its members; and then for each of the small classes, classify its members into subclasses according to the shape features of the inner outlines of its members.

The recognizing unit 400 may comprise a large class determining unit configured to perform the above described large class determining step S420 so as to determine, based on the standard color of a traffic sign corresponding to a candidate traffic sign domain, a large class to which the candidate traffic sign domain belongs; a small class determining unit configured to perform the above described small class determining step S440 so as to determine, based on the outer outline shape feature of the candidate traffic sign domain, a small class to which the candidate traffic sign domain belongs, by utilizing a pre-trained classifier; a subclass determining unit configured to perform the above described subclass determining step S460 so as to determine, based on the number of the inner outlines of the candidate traffic sign domain, a subclass to which the candidate traffic sign domain belongs; and a traffic sign matching unit configured to perform the above described traffic sign matching step S480 so as to determine, by performing matching between the candidate traffic sign domain and each standard traffic sign in the determined subclass, the candidate traffic sign domain as a standard traffic sign best matched with the candidate traffic sign domain.

The traffic sign matching unit may calculate the feature distance between the inner outline feature of the candidate traffic sign domain and the inner outline feature of each standard traffic sign in the corresponding subclass, and then determine that a standard traffic sign corresponding to the minimum feature distance is best matched with the candidate traffic sign domain.

The pre-trained classifier may carry out training by using traffic sign samples based on rotation and scale-invariance.

The traffic sign detecting device may further comprise a distance calculating unit configured to perform the above described the distance calculating step so as to, after recognizing the corresponding traffic sign, calculate the actual distance between the camera and the corresponding traffic sign on the basis of the focal length of the camera for capturing the image waiting for processing, the size of the corresponding traffic sign on the imaging sensor of the camera, and the actual size of the corresponding traffic sign in the physical world.

The traffic sign detecting device may further comprise a notifying unit configured to perform the above described notifying step so as to notify a driver of the corresponding traffic sign in a way determined on the basis of both the meaning of the recognized corresponding traffic sign and the actual distance between the corresponding traffic sign and the camera (the vehicle).

The filtering unit 200 may carry out filtering with regard to each of the pixels of the HSV color space image on the basis of a hue range and a saturation range of the standard color of the corresponding traffic sign. Only when the hue value and the saturation value of the corresponding pixel are within the hue range and the saturation range, respectively, the corresponding pixel is retained (i.e., passed through the filtering).

The removing unit 300 may remove the generated non-traffic sign domains on the basis of one or more of the following standard rules of a traffic sign:

(a) the aspect ratio of a connected domain;
(b) the position of a connected domain in an image waiting for processing;
(c) the area value of a connected domain;
(d) the color pattern of a connected domain;
(e) the shape complexity of a connected domain; and
(f) the texture complexity of a connected domain.

Consequently, in the traffic sign detecting method and the traffic sign detecting device according the above described embodiments of the present invention, the typical features of the traffic signs are efficiently utilized so as to remove the detected "non-traffic sign" candidate options. In this way, it is possible to extremely reduce the influence caused by the noise information, and to not only speed up the follow-on detection and recognition processes but also reduce the misdetection rate thereof.

Furthermore, in the traffic sign detecting method and the traffic sign detecting device according the above described embodiments of the present invention, the typical features of the traffic signs are layered so as to accomplish the progressive detection and recognition. By creating the feature tree, on each layer of the feature tree, the detection and recognition is limited to a specific range so that at each stage of detection and recognition, only a few necessary traffic sign models are involved; however, conventionally an "all-covering" model matching approach is carried out. As a result, this kind of processing in the embodiments of the present invention may not only be helpful to more accurately positioning and recognizing the traffic signs but also dramatically reduce the operational time and improve the efficiency since the range is limited.

Moreover, in the traffic sign detecting method and the traffic sign detecting device according the above described embodiments of the present invention, the meaning of each traffic sign and the distance between the corresponding traffic sign and the current vehicle are used when making a notification to a driver. As a result, this kind of notifying way is more flexible and usable, and at the same time, disturbance to the driver may be suppressed as much as possible.

A series of operations described in this specification may be executed by hardware, software, or a combination of the hardware and software. When the operations are executed by the software, a computer program may be installed in a dedicated built-in storage device of a computer so that the computer (a processor) may execute the computer program. Alternatively, the computer program may be installed in a common purpose computer by which various types of processes may be executed so that the common purpose computer (a processor) may execute the computer program.

For example, the computer program may be stored in a recording medium such as a hard disk or a ROM (a read-only memory) in advance. Alternatively, the computer program may be temporarily or permanently stored (or recorded) in a movable recording medium such as a floppy disk, a CD-ROM (a compact disc read-only memory), a MO (a magneto-optical disk) disk, a DVD (a digital versatile disk), a magic disk, or a semiconductor storage device. In addition, it is also possible to provide this kind of movable recording medium as a software package.

While the traffic sign detecting method and the traffic sign detecting device are described with reference to the specific embodiments chosen for purpose of illustration, it should be apparent that the present invention is not limited to these embodiments, but numerous modifications could be made thereto by those people skilled in the art without departing from the basic concept and technical scope of the present invention.

The present application is based on Chinese Priority Patent Application No. 201110284766.3 filed on Sep. 23, 2011, the entire contents of which are hereby incorporated by reference.

What is claimed is:

1. A method of detecting one or more traffic signs in an input image captured by a camera, comprising:
   a color space converting step of converting the input image into a HSV color space image;
   a filtering step including,
      filtering, based on a predetermined pass range of a standard color of each of the traffic signs, the HSV color space image so as to obtain a filtered image,
      generating one or more connected domains, the connected domains being regions of the filtered image that correspond to the standard color, and
      adding the connected domains onto the input image;
   a removing step of removing, based on a standard rule of the corresponding traffic signs, one or more of the generated connected domains, not being the corresponding traffic sign; and
   a recognition step of recognizing, based on a feature of each of candidate traffic sign domains, the corresponding traffic sign,
   the candidate traffic sign domains being the domains, from among the connected domains, that are not removed in the removing step.

2. The method according to claim 1, further comprising:
   a traffic sign feature tree creating step of creating a traffic sign feature tree by
      classifying standard traffic signs into large classes according to color features of outer outlines of the standard traffic signs;
      classifying, for each of the large classes, members of the large class into small classes according to shape features of the outer outlines of the members of the large class; and
      classifying, for each of the small classes, members of the small class into subclasses according to shape features of inner outlines of members of the small class.

3. The method according to claim 2, wherein, the recognition step comprises:
   a large class determining step of determining, based on the standard color of the corresponding traffic sign of the corresponding candidate traffic sign domain, a large class to which the corresponding candidate traffic sign domain belongs;
   a small class determining step of determining, based on an outer outline shape feature of the corresponding candidate traffic sign domain, a small class to which the corresponding candidate traffic sign domain belongs, by utilizing a pre-trained classifier;
   a subclass determining step of determining, based on the number of inner outlines of the corresponding candidate traffic sign domain, a subclass to which the corresponding candidate traffic sign domain belongs; and
   a traffic sign matching step of determining, by performing matching between the corresponding candidate traffic sign domain and each of the standard traffic signs in the determined subclass, a standard traffic sign in the determined subclass, best matched with the corresponding candidate traffic sign domain as the corresponding traffic sign.

4. The method according to claim 3, wherein, the traffic sign matching step comprises:
   calculating a feature distance between an inner outline feature of the corresponding candidate traffic sign domain and an inner outline feature of each of the standard traffic signs in the determined subclass, and
   determining a standard traffic sign corresponding to the minimum of the feature distances as best matched with the corresponding candidate traffic sign domain.

5. The method according to claim 3, further comprising:
   carrying out, using the pre-trained classifier, training by using traffic sign samples based on rotation and scale-invariance.

6. The method according to claim 1, further comprising:
   a distance calculating step of, after recognizing the corresponding traffic sign, calculating an actual distance between the camera and the corresponding traffic sign based on a focal length of the camera, a size of the corresponding traffic sign on an imaging sensor of the camera, and an actual size of the corresponding traffic sign.

7. The method according to claim 6, further comprising:
   a notifying step of notifying a driver of the corresponding traffic sign in a way determined according to both a meaning of the corresponding traffic sign and the calculated actual distance between the corresponding traffic sign and the camera.

8. The method according to claim 1, wherein the filtering further comprises:
- filtering each of pixels of the HSV color space image according to a predetermined hue pass range and a predetermined saturation pass range of the standard color of the corresponding traffic sign; and
- retaining the corresponding pixel only when a hue value and a saturation value of the corresponding pixel are within the predetermined hue pass range and the predetermined saturation pass range, respectively.

9. The method according to claim 1, wherein, in the removing step comprises:
- removing at least one of the generated connected domains, not being the corresponding traffic sign according to one or more of traffic sign standard rules, the traffic sign standard rules including,
- (a) an aspect ratio of a connected domain;
- (b) a position of a connected domain in an image waiting for processing;
- (c) an area value of a connected domain;
- (d) a color pattern of a connected domain;
- (e) a shape complexity of a connected domain; and
- (f) a texture complexity of a connected domain.

10. A device for detecting one or more traffic signs in an input image captured by a camera, comprising:
- a processor, and
- a storage device, the storage device storing instructions that, when executed by the processor, cause the processor to perform operations including,
  - converting the input image into a HSV color space image;
  - filtering, based on a predetermined pass range of a standard color of each of the traffic signs, the HSV color space image so as to obtain a filtered image,
  - generating one or more connected domains, the connected domains being regions of the filtered image that correspond to the standard color, and
  - adding the connected domains onto the input image;
  - removing, based on a standard rule of the corresponding traffic sign, one or more of the generated connected domains, not being the corresponding traffic sign; and
  - recognizing, based on a feature of each of the candidate traffic sign domains, the corresponding traffic sign.

* * * * *